UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF MAKING ACETYL-CELLULOSE PLASTIC MASSES.

1,076,215.  Specification of Letters Patent.  Patented Oct. 21, 1913.

No Drawing.  Application filed November 27, 1911. Serial No. 662,740.

*To all whom it may concern:*

Be it known that I, WILLIAM G. LINDSAY, a citizen of the United States, residing at Caldwell, county of Essex, State of New Jersey, have invented certain new and useful Improvements in Processes of Making Acetyl-Cellulose Plastic Masses, of which the following is a specification.

The various compositions to which the present invention relates are employed in the arts, generally as imitations of natural substances, sometimes in their original finished form with or without incorporated colors and other inert substances, and sometimes as films which are used for photographic and other purposes.

Although the final or useful form of the different compounds of acetyl cellulose is that of a solid material, the different processes of conversion into this final solid form involve, as is well understood, the employment of solutions or mixtures of varying consistency as to plasticity, stiffness, or fluidity, depending generally upon the proportion and kind of solvent used to the amount of the original base—acetyl cellulose.

It has long been known that camphor mixed with nitrocellulose upon the addition of ethyl alcohol becomes a solvent of the nitrocellulose in the cold. I have found, however, that when that process is applied to acetyl cellulose, no solvent action takes place in the cold or at the ordinary temperature of the room, and the object of my invention was to find substances which, when added to the acetyl cellulose, would exert a solvent action upon the cellulose and produce a plastic mass which could be worked in a manner analogous to nitrocellulose-camphor compounds.

In the course of my experiments I have found that camphor and methyl alcohol in proper admixture will dissolve acetyl cellulose, of the variety which is soluble in acetone, in the cold, or at room temperature, when used in certain proportions; and these proportions are important in the practice of the invention.

As one example of carrying out my invention, I take 100 parts of an acetyl cellulose which is soluble in acetone and grind it or otherwise mix it with from, say, 25 to 40 parts of camphor so that there is a thorough mixture of the two solid ingredients. I then add from 40 to 60 parts of methyl alcohol and stir until a substantially uniform mixture is produced. I then allow the mass to soak or macerate at room temperature in a closed vessel for from, say, 18 hours to a longer time, until gelatinization has taken place. The mass can then be worked in a heated press, or upon rolls, or in a stuffer, as is customary in making nitrocellulose compounds.

The essence of my invention lies in the discovery that while a mixture of ethyl alcohol and camphor is not a solvent of acetyl cellulose in the cold as it is of nitrocellulose, and that while methyl alcohol by itself is not a solvent of acetyl cellulose as it is of nitrocellulose, yet a mixture of camphor and methyl alcohol in certain proportions will dissolve acetyl cellulose of the variety named at the ordinary or room temperature.

Of course, if desired, the methyl alcohol can be incorporated with the acetyl cellulose first without departing from the spirit of my invention, because it exerts no solvent action by itself upon the cellulose, and the camphor can be added subsequently to complete the solvent mixture whereupon gelatinization takes place, but I prefer to mix the camphor and the acetyl cellulose together before adding the methyl alcohol.

It will be readily understood that slight variations in the proportions of the camphor and methyl alcohol used may be employed without serious detriment, but I prefer to use about equal parts of the camphor and the methyl alcohol. It will also be readily understood by those skilled in the art that the various coloring matters and pigments and inert substances such as are used in the nitrocellulose art, may be employed without departing from the spirit of my invention. I have also found that while my new solvent is efficient in the cold or at room temperature, the solvent action is not deterred or hindered, but is on the other hand, rather aided by the application of heat up to 100° C.

Having thus described my invention, what I claim is:—

1. The process of making acetyl cellulose plastic masses which comprises incorporating an acetone-soluble acetyl cellulose with camphor in the presence of a small proportion of methyl alcohol.

2. The process of making acetyl cellulose plastic masses which comprises incorporating an acetone-soluble acetyl cellulose with camphor in the presence of a small proportion of methyl alcohol, the proportion of alcohol being about one to one and one-half times the camphor.

3. The process of making acetyl cellulose plastic masses which comprises incorporating an acetone-soluble acetyl cellulose with camphor in the presence of a small proportion of methyl alcohol, the proportion of alcohol being about one to one and one-half times the camphor, and being about one-half the acetyl cellulose.

WILLIAM G. LINDSAY.

Witnesses:
J. E. HINDON HYDE,
MABEL DENTON.